Dec. 6, 1960  R. C. DRAVING ET AL  2,962,772
MOVABLE CARRIAGE TRAVEL REVERSING MECHANISM
Filed Oct. 18, 1957  3 Sheets-Sheet 1
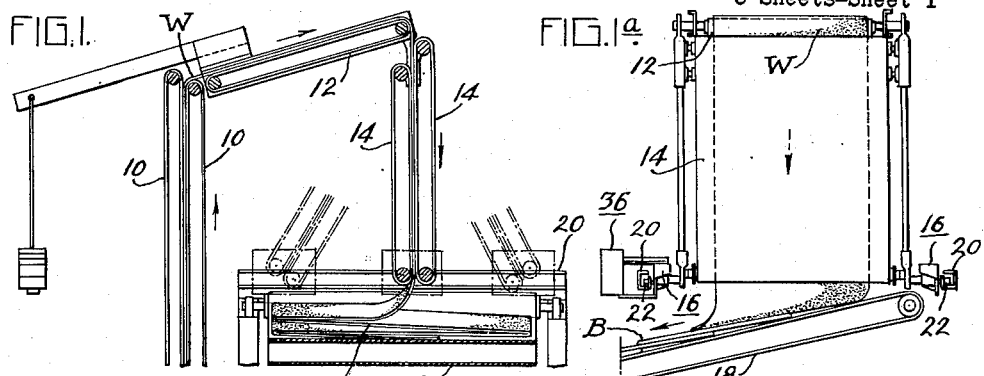
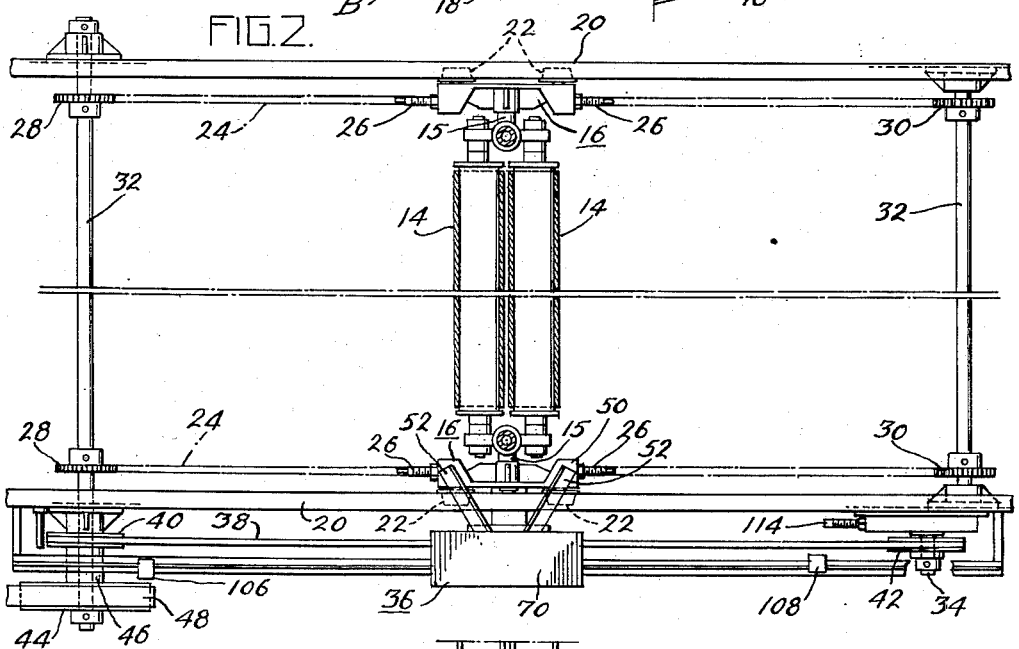
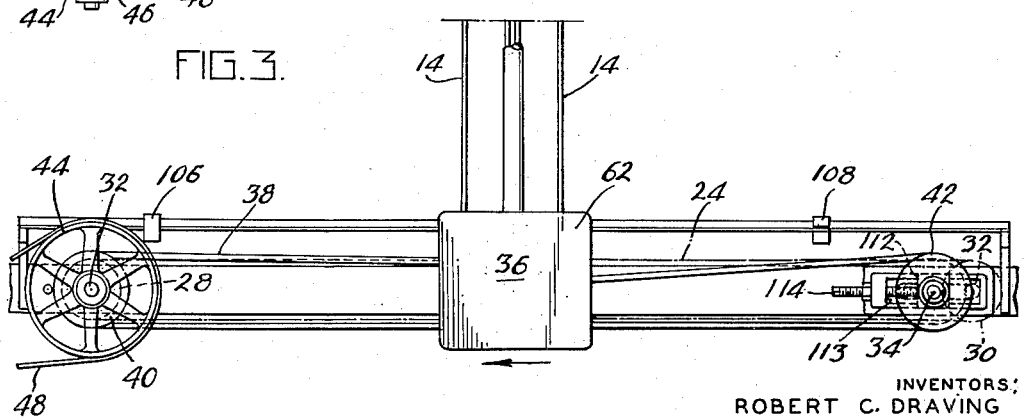
INVENTORS:
ROBERT C. DRAVING
ROBERT K. WARD
BY
Howson & Howson
ATTYS

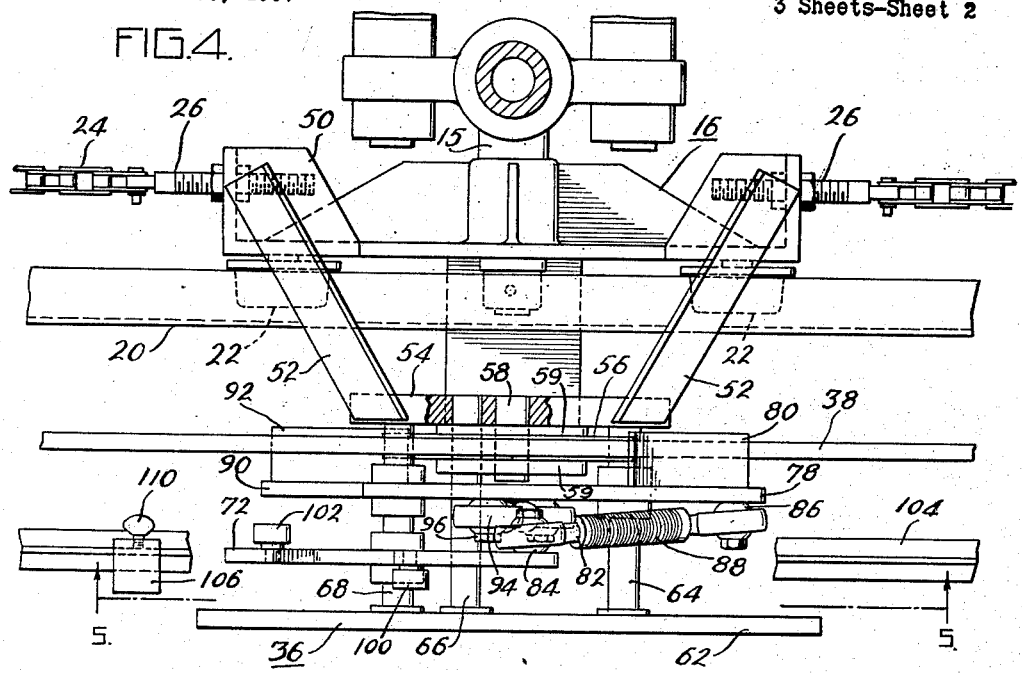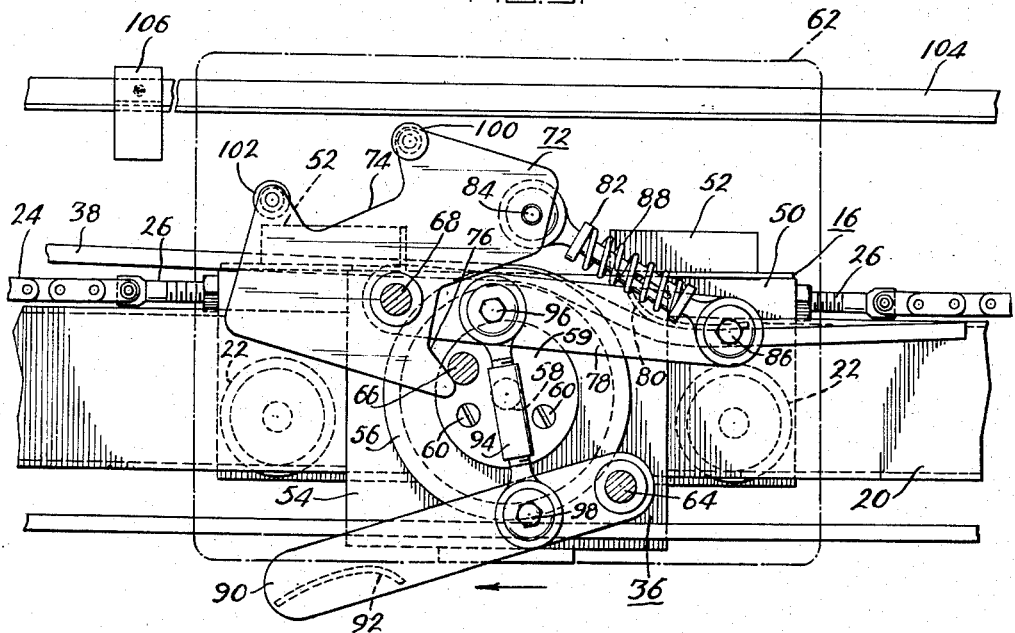

Dec. 6, 1960  R. C. DRAVING ET AL  2,962,772
MOVABLE CARRIAGE TRAVEL REVERSING MECHANISM
Filed Oct. 18, 1957  3 Sheets-Sheet 3
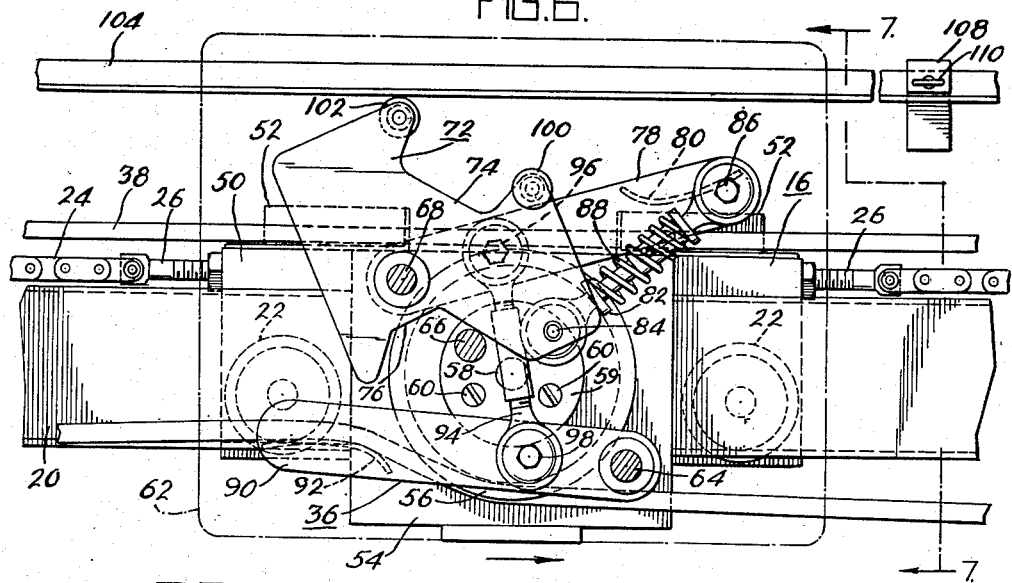
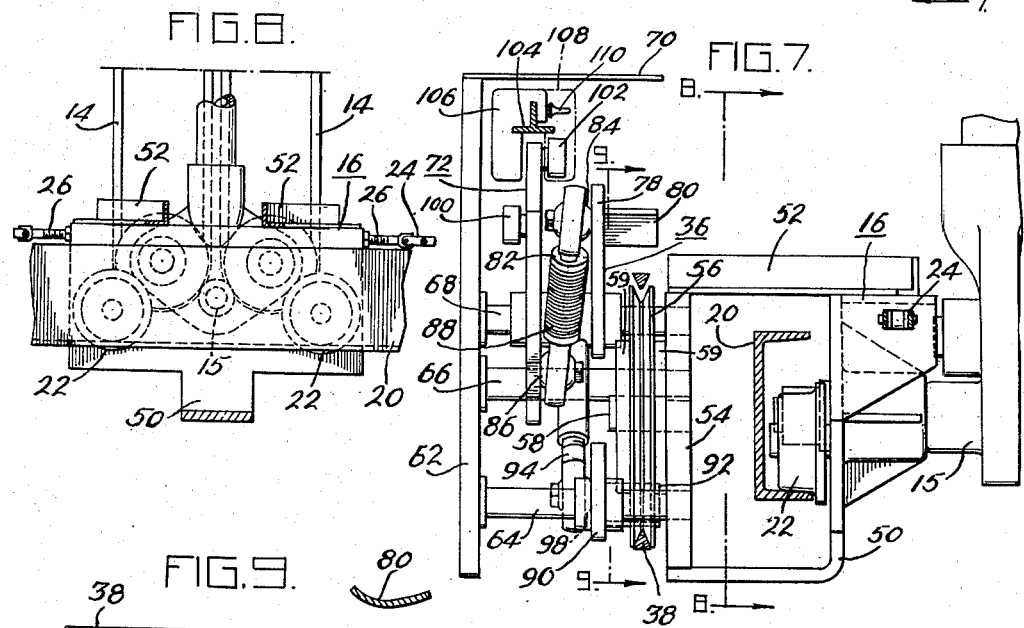
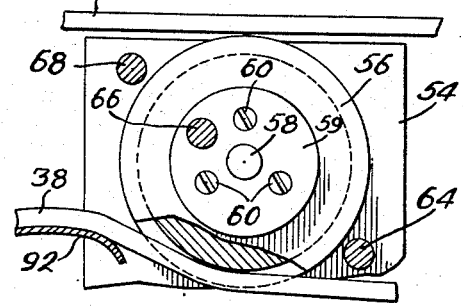
INVENTORS
ROBERT C. DRAVING
ROBERT K. WARD
BY
Howson & Howson
ATTYS.

United States Patent Office 2,962,772
Patented Dec. 6, 1960

2,962,772

MOVABLE CARRIAGE TRAVEL REVERSING MECHANISM

Robert C. Draving, Glenside, and Robert K. Ward, Doylestown, Pa., assignors to The Proctor-Silex Corporation, a corporation of Pennsylvania Filed Oct. 18, 1957, Ser. No. 690,970

9 Claims. (Cl. 19—163)

The present invention relates broadly to apparatus for traversing a carriage and the like forward and backward over a predetermined path of travel, and more particularly to an improved novel reversing mechanism, adjustable as to length of stroke, for crosser lappers and other reciprocating devices.

More specifically, the present invention utilizes a shifting mechanism wherein movement of a shift lever causes one of two paws to engage a driven belt and cause movement of a movable carriage member in one of two opposite predetermined directions.

Heretofore, movable carriage travel reversing mechanisms, as particularly applied to crosser lappers included in accepted forms a belt shifter, yoke tight and loose pulleys, cross and open belts and a reducing gear train. Efficiency of such drive systems was dependent upon the tightness of the flat belts used. Due to a tendency for all flat belts to slip, the carriage of the crosser lapper very often was subjected to considerable over-travel which resulted in batts of varying widths which required trimming and resulted in large amounts of waste product. In the older known devices of this nature, employing a rod-type shift which moved a linear cam plate against a follower carried on a bell-crank lever, a twist drive belt or open drive belt, which ever was driving at the moment of shift, was moved from driving engagement with a central drive pulley tight on the shaft to one of two idler or loose pulleys flanking the drive pulley. When one of the belts was driving, the other would be on a loose pulley. Therefore, in order to effect a reversal of movement, the belt shifter would shift one belt to the loose pulley and the one previously idling to a tight pulley. If the machine should be shut down while this shift was occurring and came to rest with the selected drive belt straddling the tight and loose pulleys, then the drive belt did not have sufficient contact with the drive pulley to overcome the starting inertia of the carriage and to start the carriage when the power was restored again.

Industry has attempted to improve such crosser lapper reversing mechanisms by use of disc type clutches, for example, or gear trains of different types. Such systems however, have not been entirely satisfactory and the present invention is primarily adapted for improving over previously known and used carriage reversing mechanisms, it being understood that this invention is applicable to many different types of machines where similar motion is required. Primarily, however, the present invention relates to a movable carriage travel reversing mechanism for textile web-lapping machines, and more particularly for crosser-lapping machines for forming multi-layered batts of indefinite length wherein problems, peculiar in that art, exist.

The invention has particular application to crosser lappers which comprise an inclined apron conveyor which receives the webs from the doffers of a Garnett machine and conveys them upwardly, onto an intermediate conveyor which in turn deposits the webs into the bite of a pair of downwardly traveling apposed apron conveyors which are pivotally mounted on a carriage which travels back and forth in a predetermined path transversely to a moving floor apron. As the apposite apron conveyors traverse across the moving floor apron, the webs are deposited on the moving floor apron in zigzag runs to form a continuous batt having a thickness dependent on the difference between the traverse speed and the speed of the moving floor apron.

In the conventional crosser lapper machines heretofore extant, the carriage for example can be reciprocated by a belt-driven reversing mechanism having a belt shifter actuated by the movement of the carriage. The belt shifter when actuated, shifts the drive from a cross belt drive to a straight belt drive, thereby reversing the direction of travel of the carriage. This form of reversing mechanism is not entirely satisfactory since the belts have a tendency to stretch and slip. The slippage, since it is not uniform, causes the carriage to over-run at the time of reversal and produce uneven selvages along the edge of the batt formed by the crosser lapper. In order to produce a satisfactory batt, the uneven selvages must be trimmed to a predetermined width, the trimmed material being wasted. The trimmed material has been found to amount to as much as approximately 25% of the material fed to the crosser lapper under certain circumstances, and this loss is substantial. Additionally, such mechanisms were subject to rapid deterioration by wear, and the driving connections are subject to breakage because of the high inertia load during reversal of the carriage as referred to hereinbefore.

With the foregoing in mind, a primary object of the invention is to provide an improved travel reversing mechanism for the movable carriage of crosser lappers which produces a quick and positive reversal of the carriage with substantially no overrun and reducing the high inertia of conventional apparatus during such reversal.

Another object of the present invention is to provide such a carriage reversing mechanism which eliminates the use of tight and loose pulleys, multiple flat belts, gear trains and belt shifters.

An additional object of the present invention is to provide in such a carriage reversing mechanism a continuously driven V belt in conjunction with rotating parts which always rotate in the same direction, and means for effecting a positive grip between the V belt and a non-rotating sheave member by means of a full toggle system and shiftable paws to effect the reversal, and in which it is impossible for the carriage to stop in a neutral position as is the case in the prior known devices.

A still further object of the present invention is to provide such a mechanism in which energy is stored in rotating parts and since the parts always rotate in the same direction, the energy aids in obtaining a quick reversal.

An additional object of the present invention is to provide in such a reversing system means permitting self-adjustment and automatic compensation for any belt stretch, under normal circumstances, by increasing the arc or area of contact of a V belt about a non-rotating sheave.

An additional object of the invention is to provide a carriage reversing mechanism of reduced initial cost and maintenance due to simplicity, and which at the same time produces lengthened trouble-free life of the mechanism.

Additional objects and advantages of the present invention will be more readily apparent from the following detailed description of an embodiment thereof when taken together with the accompanying drawings in which:

Fig. 1 is a fragmentary end elevational view of a crosser lapper to which the present invention is applied;

Fig. 1a is a fragmentary elevational view of the crosser lapper taken at right angles of Fig. 1;

Fig. 2 is a fragmentary horizontal transverse section of a crosser lapper embodying a reversing mechanism made in accordance with the present invention;

Fig. 3 is an end elevation of the crosser lapper shown in Fig. 2;

Fig. 4 is an enlarged fragmentary plan view showing details of the reversing mechanism as applied to a crosser lapper;

Fig. 5 is a fragmentary elevational view taken on line 5—5 of Fig. 4, showing the mechanism arranged for movement of the carriage in one direction;

Fig. 6 is a view similar to Fig. 5 showing the mechanism arranged for movement of the carriage in the opposite direction;

Fig. 7 is an elevational view taken on line 7—7 of Fig. 6;

Fig. 8 is a sectional view taken on line 8—8 of Fig. 7, and

Fig. 9 is a sectional view taken on line 9—9 of Fig. 7.

Referring now to the drawings, and more particularly to Figs. 1 and 1a thereof, the crosser lapper of the present invention comprises apposed apron conveyors 10, 10 which convey a web W from the doffer upwardly and deposit the same on an intermediate conveyor 12 pivotally mounted at its leading edge and counterbalanced by a weight, in the directions indicated by the arrows. From the intermediate conveyor 12, the web W is fed between the bite of a pair of pivotally suspended, apposed downwardly traveling conveyor or traverse aprons 14, 14 which are conjointly pivotally mounted at their lower ends, as at 15, on a carriage 16 which travels back and forth over a moving floor apron 18 to form a batt B. As will be apparent from Fig. 1, the traverse aprons 14, 14 have their lower ends moving transversely back and forth over floor apron 18 into the extreme positions, indicated in broken lines, to effect the laying of the continuous layers on the apron 18 as this moves in a direction at right angles to the movement of the traverse aprons 14. By reference to Figs. 1a, 2 and 3 particularly, the carriage 16 to which the traverse aprons are conjointly pivotally connected travels on guide rails 20 in the nature of channel members which rotatably support flanged rollers or wheels 22 operatively associated with the carriage 16 on either side of the traverse aprons 14, 14 for movement thereof in the desired manner.

The carriages 16, 16 are adapted to be advanced simultaneously and at an equal rate of speed by means of endless chains 24, 24 which are secured to the carriages on each side of the device as indicated at 26. The chains 24 are trained over sprockets 28, 28 and sprockets 30, 30, which are respectively secured on rotatable shafts 32, 32.

The actual drive for the carriages and traverse aprons is derived through reversing mechanism broadly designated 36 in conjunction and coaction with a V belt 38 which is entrained over sheaves 40 and 42 freely mounted on shaft 32 and stud shaft 34. Sheave 40 is integral with pulley 44 through hub 46. A belt or chain 48 entrained over pulley 44 is adapted to drive pulley 44 together with sheave 40, and accordingly V belt 38, from a Garnett machine or the like (not shown) preceding the crosser lapper. The V belt 38 in this arrangement is driven at all times in the same direction, and through the reversing mechanism to be described hereinafter the operation of the traverse aprons in opposite directions is made possible and reversal is effected in a positive and substantially instantaneous manner.

Carriage 16 has a bracket 50 (Figs. 7 and 8) connected thereto and incorporating brace members 52. The bracket 50 includes a vertical plate 54, on the outside of which a stationary V belt sheave 56 is secured on stub axle 58. Stub shaft 58 is secured to plate 54 in any desired manner and carries fixed spaced discs 59 to which sheave 56 is secured by screws 60 or the like. The V belt 38 is positioned in alignment with the V groove in V belt sheave 56 as shown in Fig. 7. A plate 62 is arranged in spaced parallel relationship with plate 54 and is interconnected thereto by means of three spaced fixed shafts 64, 66 and 68. A cover 70 extends inwardly from the top of plate 62 to a position over plate 54. A shifter toggle link 72 is pivotally mounted on shaft 68 and the link is provided with inwardly directed cam surfaces or openings 74 and 76. The shaft 66 in conjunction with the cam surface 76 provides extreme position stop means for the shifter toggle link as will be seen by a comparison of Figs. 5 and 6 of the drawings.

An upper shifter paw link 78 is pivotally journaled on shaft 68 behind shifter toggle link 72 and has thereon a shifter paw or shoe 80 of curvilinear configuration and which extends over the upper run of V belt 38 (Fig. 7). A toggle link 82 has its upper end pivotally mounted at 84 on shifter toggle link 72, and its lower end pivotally secured at 86 to upper shifter paw link 78. As shown in Fig. 5 of the drawings, this toggle link 82 is formed of two relatively telescopic parts and is surrounded by a compression spring 88 to force the two portions into extended position.

A lower shifter paw link 90 having a paw or shoe 92, similar in configuration to paw 80, and extending under the lower run of V belt 38 is pivotally mounted on shaft 64. An adjustable toggle link 94 has its upper end pivotally connected to upper shifter paw link 78 at 96, and its lower end pivotally connected to lower shifter paw link 90 at 98.

Cam rollers 100 and 102 are mounted at opposite ends of the cam surface 74 on shifter toggle link 72 and are disposed on opposite faces of the link.

A stationary beam extends longitudinally above the guide rails 20, and in close proximity to the uppermost extremity of shifter toggle link 72. Adjustably mounted on the beam 104, in proximity to each end of the run of the traverse aprons and carriages, are shifter blocks 106 and 108 which can be adjusted along the length of the beam 104 and secured in position by means of wing nuts 110 or the like. The downwardly extending portions of these shifter blocks 106 and 108 are on opposite sides of the stationary beam 104, and accordingly are engageable by only a single roller cam since these roller cams are disposed on opposite sides of the shifter toggle link 72.

Means are provided for maintaining proper adjustment of freely rotating pulley 42 mounted on stud 34. Stud 34 is mounted on block 112 which in turn is mounted to channel 20 through a slot 113 which allows transverse movement of block 112 by means of adjustable screw member 114. Thus belt 38 can be kept in proper tension. Chains 24 can be adjusted through the screw thread type of fastening of the chains at 26.

It is believed that operation of the reversing mechanism will be apparent from the foregoing description, but briefly the shifting mechanism or reversing mechanism 36 is attached to carriage 16 which supports traverse aprons 14, 14 which traverse back and forth between guide rails 20. The length of the course of travel is adjustable depending upon the distance between shifter blocks 106 and 108. The shifter toggle link 72 is actuated to pivot by contact with shifter blocks 106 and 108 upon contact by cam rollers 100 or 102, depending upon the end of the travel and the direction of movement. Toggle spring 88 and toggle link 82 provide the toggle action. The pivotal movement of toggle link 72 causes shifter paw links 78 and 90 to be displaced about their respective pivots 68 and 64, causing either paw 80 or 92 to force V belt 38 into the groove of stationary V belt sheave 56. It is to be noted that V belt sheave 56 does not rotate at any time since it is rigidly mounted on stationary plate 54. The locking of V belt 38 in the groove of the sheave causes the carriage 16 to be carried along with the V belt in the appropriate direction depending upon whether paw 80 or 92 is in the locking position. In the drawings, the V belt contacting position of paw 80 in Fig. 5 will cause movement of the carriage and reversing mechanism to the left, and the position of paw 92 as shown in Fig. 6 will cause movement of the carriage and reversing mechanism to the right.

The endless V belt 38 is continuously running at a predetermined but adjustable speed in one direction around sheave 42. When the carriage 16 reaches the desired end of travel in one direction, cam roller 100 or 102, disposed on opposite sides of shifter toggle link 72, is engaged by shifter block 106 or 108, thereby pivoting toggle link 72 to the opposite position which in turn causes the V belt 38 to become disengaged from one side of the stationary sheave 56, and simultaneously engages the V belt on the opposite side of the sheave thereby effectively reversing the direction of travel of the carriage. It will be seen that the present system is substantially self-adjusting, and will automatically compensate for belt stretching by increasing the arc of contact of the V belt around the non-rotating sheave. When the belt has stretched too far however, the tension can be adjusted by means of the slidable block mounts 112.

Also as previously pointed out, the full toggle system makes it impossible for the carriage to stop in a neutral position as is the case in the prior art. The large bearing surface of a V belt provides a positive grip on the non-rotating sheave and further, since the shifting action occurs at different points on the V belt at each shifting time, long V belt life can be expected. The reversal of direction of movement in accordance with the present teachings is instantaneous upon pivoting of the toggle link 72, and since energy is stored in the rotating parts and the parts always rotate in the same direction, the energy aids in obtaining a quick reversal.

While a single embodiment of the invention has been shown and described, manifestly minor changes in details of construction can be effected without departing from the spirit and scope of the invention as defined in the appended claims.

We claim:

1. Drive means for moving a movable carriage alternately between two adjustably determinable positions comprising first and second spaced rotatable shafts, means movably interconnecting said shafts and said carriage, a stationary sheave connected to said carriage, a continuous V belt mounted on freely rotatable pulleys with its opposed runs normally spaced from said sheave on opposite side thereof and adapted for coaction with said sheave, means for moving said belt in a predetermined direction, belt engaging pawl members mounted adjacent opposed runs of said belt and external thereof in proximity to and horizontally spaced from said sheave along said belt runs on horizontally opposite sides of said sheave and means operatively connected to said paws for selectively engaging one of said paws at a time with the exterior surface of said belt to press a portion of said belt on one said run into engagement with said stationary sheave dependent upon location of said carriage to thereby positively and instantaneously drive said carriage in one of two directions.

2. Drive means for movable carriages as claimed in claim 1, wherein said paw engaging means comprises a toggle lever system secured to said carriage for movement therewith including a shifter toggle link pivotally mounted for movement between two predetermined positions, pivotally mounted shifter paw links, said paws being mounted on said shifter paw links, a first toggle link interconnecting said shifter toggle link and one said shifter paw link, a second toggle link interconnecting said shifter paw links and means for pivoting said shifter toggle link dependent on location of said carriage to simultaneously disengage one said paw from said belt and engage the other said paw through action of said toggle system.

3. Drive means for movable carriages as claimed in claim 2, a stationary beam mounted in proximity to said toggle lever system, shifter blocks adjustably mounted on said beam for predetermined adjustable end of movement positions for said carriage, and means on said shifter toggle link engageable with said shifter blocks to pivot said shifter toggle link to one or the other of said predetermined positions.

4. Drive means for movable carriages as claimed in claim 3, said shifter blocks having shifter toggle link engaging surfaces, said surfaces being disposed on opposite sides of said beam at opposite ends of the carriage run, and said shifter block engaging means on said shifter toggle link including one member on each side thereof whereby two coacting sets of shifter means are provided only one of which is engageable at a time.

5. Drive means for movable carriages as claimed in claim 4, said shifter toggle link having a first indented cam surface thereon, said shifter block engaging means comprising cam rollers disposed at opposite ends of said indented cam surface.

6. Drive means for movable carriages as claimed in claim 5, a second indented cam surface on said shifter toggle link, and a stop on said stationary sheave engageable with portions of said second indented cam surface to limit movement of said shifter toggle link in either pivoted direction.

7. Drive means for movable carriages as claimed in claim 1, wherein said paw engaging means comprises a toggle lever system secured to said carriage for movement therewith including a shifter toggle link pivotally mounted for movement between two predetermined positions, pivotally mounted shifter paw links, said paws being mounted on said shifter paw links, a first toggle link interconnecting said shifter toggle link and one said shifter paw link, a second toggle link interconnecting said shifter paw links, means for pivoting said shifter toggle link dependent on location of said carriage to simultaneously disengage one said paw from said belt and engage the other said paw through action of said toggle system said first toggle link including two relatively telescopic parts and a toggle spring mounted thereover and having the ends thereof respectively secured to the two parts, said toggle spring and said first toggle link providing the toggle action.

8. Drive means for movable carriages as claimed in claim 1, said means for selectively engaging said paws comprising a full toggle system whereby stoppage of said carriage in a neutral position is prevented.

9. In a crosser lapper machine for a moving floor apron, having an upright conveyor carried by a carriage mounted for reciprocating movement across said apron between opposite limit positions, means for driving said carriage in opposite directions and reversing the direction of travel positively and instantaneously at said limit positions including first and second spaced rotatable shafts, means movably interconnecting said shafts and said carriage, a stationary sheave connected to said carriage, a continuous V belt mounted on freely rotatable pulleys with its opposed runs normally spaced from said sheave on opposite sides thereof and adapted for coaction with said sheave, means for moving said belt in a predetermined direction, belt engaging paw members mounted adjacent opposed runs of said belt and external thereof in proximity to said sheave and means operatively connected to said paws for selectively engaging one of said paws at a time with the exterior surface of said belt to press a portion of said belt on one said run into engagement with said stationary sheave dependent upon location of said carriage to thereby drive said carriage in one of two directions.

References Cited in the file of this patent

UNITED STATES PATENTS

| | | |
|---|---|---|
| 520,827 | Koss | June 5, 1894 |
| 1,467,693 | Scribner | Sept. 11, 1923 |
| 2,490,035 | Deakin | Dec. 6, 1949 |

UNITED STATES PATENT OFFICE
CERTIFICATE OF CORRECTION

Patent No. 2,962,772                          December 6, 1960

Robert C. Draving et al.

It is hereby certified that error appears in the above numbered patent requiring correction and that the said Letters Patent should read as corrected below.

In the grant, line 3, and in the heading to the printed specification, line 6, for "a corporation of Pennsylvania", each occurrence, read -- a corporation of Connecticut --.

Signed and sealed this 12th day of September 1961.

(SEAL)
Attest:

ERNEST W. SWIDER
Attesting Officer

DAVID L. LADD
Commissioner of Patents
USCOMM-DC